(12) United States Patent
Rose et al.

(10) Patent No.: US 9,235,563 B2
(45) Date of Patent: Jan. 12, 2016

(54) SYSTEMS AND PROCESSES FOR IDENTIFYING FEATURES AND DETERMINING FEATURE ASSOCIATIONS IN GROUPS OF DOCUMENTS

(71) Applicant: BATTELLE MEMORIAL INSTITUTE, Richland, WA (US)

(72) Inventors: Stuart J. Rose, Richland, WA (US); Wendy E. Cowley, Richland, WA (US); Vernon L. Crow, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 316 days.

(21) Appl. No.: 13/769,629

(22) Filed: Feb. 18, 2013

(65) Prior Publication Data

US 2013/0173257 A1  Jul. 4, 2013

Related U.S. Application Data

(63) Continuation-in-part of application No. 12/568,365, filed on Sep. 28, 2009, now abandoned.

(60) Provisional application No. 61/222,737, filed on Jul. 2, 2009.

(51) Int. Cl.
| | | |
|---|---|---|
| G06F 17/00 | (2006.01) | |
| G06N 5/00 | (2006.01) | |
| G06F 17/27 | (2006.01) | |
| G06F 17/30 | (2006.01) | |

(52) U.S. Cl.
CPC ............. *G06F 17/27* (2013.01); *G06F 17/277* (2013.01); *G06F 17/30705* (2013.01)

(58) Field of Classification Search
USPC .......................................................... 706/45
See application file for complete search history.

(56) References Cited

U.S. PATENT DOCUMENTS

| | | | |
|---|---|---|---|
| 4,319,085 A | 3/1982 | Welch et al. | |
| 5,687,364 A | 11/1997 | Saund et al. | |
| 6,128,613 A | 10/2000 | Wong et al. | |
| 6,189,002 B1 | 2/2001 | Roitblat | |
| 6,289,337 B1 * | 9/2001 | Davies et al. | .......................... 1/1 |

(Continued)

OTHER PUBLICATIONS

Pattern and Cluster Mining on Text Data, Agnihotri, D. ; Verma, K. ; Tripathi, P. Communication Systems and Network Technologies (CSNT), 2014 Fourth International Conference on DOI: 10.1109/CSNT.2014.92 Publication Year: 2014 , pp. 428-432.*

(Continued)

Primary Examiner — Michael B Holmes
(74) Attorney, Agent, or Firm — Wells St. John P.S.

(57) ABSTRACT

Systems and computer-implemented processes for identification of features and determination of feature associations in a group of documents can involve providing a plurality of keywords identified among the terms of at least some of the documents. A value measure can be calculated for each keyword. High-value keywords are defined as those keywords having value measures that exceed a threshold. For each high-value keyword, term-document associations (TDA) are accessed. The TDA characterize measures of association between each term and at least some documents in the group. A processor quantifies similarities between unique pairs of high-value keywords based on the TDA for each respective high-value keyword and generates a similarity matrix that indicates one or more sets that each comprise highly associated high-value keywords.

20 Claims, 15 Drawing Sheets

| Defined Topics | CAST Themes |
|---|---|
| mugabe<br>2002 presidential election in Zimbabwe | mugabe's re-election (46)<br>zimbabwe's election, mugabe, mugabe's, president mugabe, mugabe's government |
| guantanamo<br>U.S. holding prisoners in Guantanamo Bay | guantanamo prisoners (43)<br>detainees as prisoner, detainees prisoners, prisoners of war, war prisoners, prisoners |
| kyoto<br>ratification of Kyoto Protocol | kyoto protocol on climate (40)<br>kyoto protocol, ratification of the kyoto protocol, 1997 kyoto protocol |
| venezuela<br>presidential coup in Venezuela | venezuela's president hugo chavez (37)<br>venezuelan president hugo chavez, president hugo chavez, president chavez, hugo chavez |
| settlements<br>Israeli settlements in Gaza and West Bank | israeli (34)<br>palestinian, israel, occupied palestinian, israeli occupation, palestinian people's |
| taiwan<br>relations between Taiwan and China | china under which taiwan (31)<br>taiwan, united states and taiwan, taiwan issue, taiwan policy, taiwan affairs, taiwan strait |
| axisofevil<br>reaction to President Bush's 2002 State of the Union Address | axis of evil (28)<br>north korea as axis, iran and north korea, iran or north korea, iraq and north korea |

(56) References Cited

U.S. PATENT DOCUMENTS

| | | | |
|---|---|---|---|
| 6,304,841 | B1 | 10/2001 | Berger et al. |
| 6,470,307 | B1 | 10/2002 | Turney |
| 6,665,661 | B1* | 12/2003 | Crow et al. .......................... 1/1 |
| 6,718,336 | B1* | 4/2004 | Saffer ............... G06F 17/30557 1/1 |
| 6,886,010 | B2 | 4/2005 | Kostoff |
| 6,940,509 | B1* | 9/2005 | Crow ................... G06T 11/206 345/440 |
| 6,990,238 | B1* | 1/2006 | Saffer ............... G06F 17/30716 382/224 |
| 7,249,012 | B2 | 7/2007 | Moore |
| 7,275,061 | B1 | 9/2007 | Kon et al. |
| 7,421,418 | B2* | 9/2008 | Nakano ........................... 706/52 |
| 7,451,139 | B2 | 11/2008 | Namba |
| 7,505,969 | B2 | 3/2009 | Musgrove et al. |
| 7,539,677 | B1* | 5/2009 | Wong ............... G06F 17/30994 1/1 |
| 7,557,805 | B2* | 7/2009 | Wong ...................... H04L 67/36 345/440 |
| 7,627,559 | B2 | 12/2009 | Srivastava et al. |
| 7,636,730 | B2* | 12/2009 | Sanfilippo ........... G06F 17/3071 1/1 |
| 7,860,706 | B2 | 12/2010 | Abir |
| 7,890,539 | B2 | 2/2011 | Boschee et al. |
| 7,895,210 | B2* | 2/2011 | Bohn .................. G06F 17/3066 707/741 |
| 7,917,548 | B2* | 3/2011 | Gibson ............. G06F 17/30569 707/804 |
| 8,073,859 | B2* | 12/2011 | Wong ............... G06F 17/30994 345/588 |
| 8,131,735 | B2* | 3/2012 | Rose ................. G06F 17/30616 704/4 |
| 8,145,623 | B1* | 3/2012 | Mehta et al. ................... 707/713 |
| 8,352,469 | B2* | 1/2013 | Rose ...................... G06F 17/277 706/45 |
| 8,537,352 | B2* | 9/2013 | Eikelmann et al. ............ 356/246 |
| 8,553,034 | B2* | 10/2013 | Wong ....................... H04L 41/22 345/440 |
| 8,671,112 | B2* | 3/2014 | Amar et al. .................... 707/780 |
| 8,775,409 | B1* | 7/2014 | Mehta et al. ................... 707/713 |
| 8,782,805 | B2* | 7/2014 | Zhang et al. ..................... 726/30 |
| 9,069,847 | B2* | 6/2015 | Turner ............... G06F 17/30713 1/1 |
| 2004/0139058 | A1 | 7/2004 | Gosby et al. |
| 2004/0162827 | A1* | 8/2004 | Nakano .............................. 707/6 |
| 2006/0020662 | A1 | 1/2006 | Robinson |
| 2006/0026152 | A1 | 2/2006 | Zeng et al. |
| 2007/0005566 | A1 | 1/2007 | Bobick et al. |
| 2007/0061320 | A1 | 3/2007 | Surendran |
| 2007/0073533 | A1 | 3/2007 | Thione et al. |
| 2008/0077570 | A1* | 3/2008 | Tang et al. ........................ 707/5 |
| 2008/0147644 | A1 | 6/2008 | Aridor et al. |
| 2008/0162528 | A1 | 7/2008 | Jariwala |
| 2008/0306899 | A1* | 12/2008 | Gregory et al. ................... 707/1 |
| 2009/0024555 | A1 | 1/2009 | Rieck et al. |
| 2009/0094021 | A1 | 4/2009 | Marvit et al. |
| 2009/0254581 | A1* | 10/2009 | Chappell et al. ............... 707/102 |
| 2010/0063799 | A1 | 3/2010 | Jamieson |
| 2011/0004465 | A1* | 1/2011 | Rose et al. ........................ 704/9 |
| 2011/0004610 | A1* | 1/2011 | Rose ............................... 707/759 |
| 2011/0055192 | A1* | 3/2011 | Tang et al. .................... 707/706 |
| 2011/0060747 | A1* | 3/2011 | Rose et al. .................... 707/750 |
| 2013/0173257 | A1* | 7/2013 | Rose et al. ......................... 704/9 |

OTHER PUBLICATIONS

Summarizing text by ranking text units according to shallow linguistic features, Gupta, P. ; Pendluri, V.S. ; Vats, I. Advanced Communication Technology (ICACT), 2011 13th International Conference on Publication Year: 2011 , pp. 1620-1625.*

A new search method for ranking short text messages using semantic features and cluster coherence, Trifan, M. ; Ionescu, D. Computational Cybernetics and Technical Informatics (ICCC-CONTI), 2010 International Joint Conference on DOI: 10.1109/ICCCYB.2010. 5491333 Publication Year: 2010 , pp. 643-648.*

A Template Independent Method for Large Online News Content Extraction, Yu-Chieh Wu ; Jie-Chi Yang Advanced Applied Informatics (IIAIAAI), 2012 IIAI International Conference on DOI: 10.1109/ IIAI-AA1.2012.58 Publication Year: 2012 , pp. 254-257.*

SPOT the Drug! An Unsupervised Pattern Matching Method to Extract Drug Names from Very Large Clinical Corpora Coden, A. ; Gruhl, D. ; Lewis, N. ; Tanenblatt, M. ; Terdiman, J. Healthcare Informatics, Imaging and Systems Biology (HISB), 2012 IEEE Second Intl Conference on DOI: 10.1109/HISB.2012.16 Publication Year: 2012 , pp. 33-39.*

A threshlod selection method based on multiscale and graylevel co-occurrence matrix analysis, Yun Li ; Cheriet, M. ; Suen, C.Y. Document Analysis and Recognition, 2005. Proceedings. Eighth International Conference on DOI: 10.1109/ICDAR.2005.36 Publication Year: 2005 , pp. 575-578 vol. 2.*

Document clustering and topic discovery based on semantic similarity in scientific literature Jayabharathy, J.; Kanmani, S.; Parveen, A.A. Communication Software and Networks (ICCSN), 2011 IEEE 3rd International Conference on Year: 2011 pp. 425-429, DOI: 10.1109/ICCSN.2011.6014600 Referenced in: IEEE Conf. Publication.*

A survey on semantic document clustering Naik, Maitri P.; Prajapati, Harshadkumar B.; Dabhi, Vipul K. Electrical, Computer and Communication Technologies (ICECCT), 2015 IEEE International Conference on Year: 2015 pp. 1-10, DOI: 10.1109/ICECCT.2015. 7226036 Referenced in: IEEE Conference Publications.*

A syntactic approach for processing mathematical expressions in printed documents Garain, U.; Chaudhuri, B.B. Pattern Recognition, 2000. Proceedings. 15th International Conference on Year: 2000, vol. 4 pp. 523-526 vol. 4, DOI: 10.1109/ICPR.2000.902972 Referenced in: IEEE Conference Publications.*

Document grouping with concept based discriminative analysis and feature partition Kajapriya, S.; Vimal Shankar, K.N. Information Communication and Embedded Systems (ICICES), 2014 International Conference on Year: 2014 pp. 1-4, DOI: 10.1109/ICICES. 2014.7033763 Referenced in: IEEE Conference Publications.*

WO PCT/US2010/042595 IPRP, Apr. 3, 2012, Battelle Memorial Institute.

WO PCT/US2010/042595 Search Rept., Oct. 6, 2010, Battelle Memorial Institute.

WO PCT/US2010/042595 Writ. Opin., Oct. 6, 2010, Battelle Memorial Institute.

Bernardini et al., "Full-Subtopic Retrieval with Keyphrase-Based Search Results Clustering", IEEE/WIC/ACM International Conference on Web Intelligence and Intelligent Agent Technology, Sep. 16, 2009, Italy, pp. 206-213.

Fisher et al., "Narratives: A Visualization to Track Narrative Events as they Develop", IEEE Symposium on Visual Analytics Science and Technology, Oct. 21-23, 2008, United States, pp. 115-122.

Fox, "A Stop List for General Text", ACM SIGIR Forum vol. 24, Issue 1-2, 1989, United States, pp. 19-35.

Havre et al., "ThemeRiver: Visualizing Thematic Changes in Large Document Collection", IEEE Transactions on Visualization and Computer Graphics vol. 8, No. 1, Jan.-Mar. 2002, United States, pp. 9-20.

Kleinberg, "Bursty Hierachical Structure in Streams", Proceedings of the 8th ACM SIGKDD International Conference on Knowledge Discovery and Data Mining, 2002, Canada, pp. 91-101.

Kumar et al., "Automatic Keyphrase Extraction from Scientific Documents Using N-Gram Filtration Technique", ACM Symposium on Document Engineering, Sep. 16, 2008, Brazil, pp. 199-208.

Leskovec et al., "Meme Tracker", online Jun. 24, 2006, at http:memetracker.org//, 2 pages.

Maslowska, "Phrase-Based Hierarchical Clustering of eb Search Results", F. Sebastianai (Ed.) ECIR 2003, Springer Verlag, Berlin, pp. 555-562.

Mihalcea et al., "Text Rank: Bringing Order into texts", University of Texas Department of Computer Science, United States, 8 pages, date unknown.

Raje et al., "Extraction of Key Phrases from Document Using Statistical and Linguistic Analysis", IEEE ICCSE 4th International Conference on Computer Science & Education, Jul. 25, 2009, United States, pp. 161-164.

(56) References Cited

OTHER PUBLICATIONS

Rose et al., U.S. Appl. No. 61/222,737, filed Jul. 2, 2009, titled "Feature Extraction Methods and Apparatus for Information Retrieval and Analysis", 26 pages.

Turney, "Learning to Extract Key Phrases from Text", NRC-CNRC National Research Counsil of Canada vol. NRC/ERB-1057, Feb. 1, 1999, Canada, 45 pages. (http://www.iit-iti.nrc.cnrc.gc.ca/iit-publications-iti/docs/NRC-41622.pd).

* cited by examiner http://www.voanews.com/english/archive/2008-02/2008-02-21-vos21.cfm

Pakistani Opposition Parties Agree on Ruling Coalition
By Barry Newhouse
Islamabad
21 February 2008

The leaders of Pakistan's two main opposition parties have agreed to form a coalition in the national assembly that will control a majority of seats. VOA's Barry Newhouse reports the opposition leaders say the have come to an agreement on the crucial issue of reinstating the Supreme Court that Mr. Musharraf dismissed in November. Nawaz Sharif, right, speaks to reporters as Asif Ali Zardari sit next to him at press conference after their meeting in Islamabad, 21 Feb 2008. At a joint news conference in Islamabad, Pakistan People's Party leader Asif Zardari and Nawaz Sharif of the Pakistan Muslim League-N told reporters the two parties would work together on what they called a government of national consensus. Zardari said they are focused on strengthening Pakistan's democracy. "We intend to be together in the parliament," he said. "We have, insha'allah, a future of democracy in our grasp. We will strengthen the parliament, we will make a stronger Pakistan."
While the two parties had campaigned on a similar agenda that criticized President Pervez Musharraf and his ruling Pakistan Muslim League-Q party, analysts said there were indications they had different views on the issue of reinstating senior judges dismissed by Mr. Musharraf in November.
Nawaz Sharif read reporters a prepared statement on the position that both parties have agreed to.
"In principle there is no disagreement on the restoration of the judiciary. We will work out the modalities in the parliament," he said.
Lawyers who demonstrated in major cities in Pakistan had demanded the immediate reinstatement of the dismissed senior judges. Instead, it appears the parties will wait until they take control of parliament in the coming weeks before taking up the issue.

*Fig. 1a*

The judges' dismissals have been the central political issue for Pakistan Muslim League-N leader Nawaz Sharif. Earlier Thursday, he addressed hundreds of supporters outside the home of the fired Supreme Court Chief Justice, Iftikhar Mohammed Chaudry, saying President Musharraf's dismissal of the Supreme Court was illegal. Chaudry has been under house arrest since November.
The PPP's Zardari also said the two parties are focused on building a broad coalition in parliament.
"We are trying to come up with a national consensus government with all political forces in and outside of the parliament," said Zardari.
The coalition brings the two parties closer to gaining a two-thirds majority in parliament. The super-majority is needed if the parties try to impeach President Musharraf.

Extracted Keywords pakistan muslim league-n leader nawaz sharif,
pakistan people's party leader asif zardari,
pakistan muslim league-n told reporters, ruling pakistan muslim league-q party,
mawaz sharif read reporters, pakistani opposition parties agree,
fired supreme court chief justice, asif ali zardari sits,
reinstating senior judges dismissed, main opposition parties, mawaz sharif,
stronger pakistan, pakistan, dismissed senior judges,
criticized president pervez musharraf,
saying president musharraf's dismissal, supreme court

*Fig. 1b*

| Defined Topics | CAST Themes |
|---|---|
| *mugabe*<br>2002 presidential election in Zimbabwe | *mugabe's re-election (46)*<br>zimbabwe's election, mugabe, mugabe's, president mugabe, mugabe's government |
| *guantanamo*<br>U.S. holding prisoners in Guantanamo Bay | *guantanamo prisoners (43)*<br>detainees as prisoner, detainees prisoners, prisoners of war, war prisoners, prisoners |
| *kyoto*<br>ratification of Kyoto Protocol | *kyoto protocol on climate (40)*<br>kyoto protocol, ratification of the kyoto protocol, 1997 kyoto protocol |
| *venezuela*<br>presidential coup in Venezuela | *venezuela's president hugo chavez (37)*<br>venezuelan president hugo chavez, president hugo chavez, president chavez, hugo chavez |
| *settlements*<br>Israeli settlements in Gaza and West Bank | *israeli (34)*<br>palestinian, israel, occupied palestinian, israeli occupation, palestinian people's |
| *taiwan*<br>relations between Taiwan and China | *china under which taiwan (31)*<br>taiwan, united states and taiwan, taiwan issue, taiwan policy, taiwan affairs, taiwan strait |
| *axisofevil*<br>reaction to President Bush's 2002 State of the Union Address | *axis of evil (28)*<br>north korea as axis, iran and north korea, iran or north korea, iraq and north korea |

*Fig. 2a*

| | |
|---|---|
| *humanrights* reaction to U.S. State Department report on human rights | *human rights (28)* human rights report, annual human rights report, human rights violations, rights |
| *spacestation* space missions of various countries | *space station (28)* international space station, space, international space, space shuttle, russian space mission |
| *argentina* economic collapse in Argentina | *argentina (12)* argentina's, help argentina, argentine government, argentine, worried argentina |

*Fig. 2b*

| Assigned Docs | | Theme |
|---|---|---|
| <01/12 | 01/12 | |
| 1 | 5 | chuan government |
| 0 | 3 | serena williams who is playing |
| 0 | 3 | men's match |
| 0 | 2 | stabilizing japan's shaken financial system |
| 0 | 1 | women's race |
| 1 | 2 | news agency |
| 3 | 2 | five-kilometer race |
| 3 | 1 | northern ireland |
| 5 | 1 | japanese prime minister ryutaro hashimoto |
| 6 | 1 | world cup |
| 7 | 1 | president suharto |
| 9 | 3 | world swimming championships |
| 15 | 4 | hong kong |

*Fig. 3*

| Day | Document Title |
|---|---|
| 02-07 | U.N. to excavate weapons dumps in Iraq |
| 02-07 | Kuwaiti government to distribute gas masks in two days |
| 02-07 | U.N. to excavate dumps where chemical weapons and warheads buried |
| 02-08 | Saudi Arabia will not back military strike against Iraq |
| 02-08 | Egyptian Foreign Minister upbeat on diplomatic end to US-Iraq |
| 02-08 | Russian FM: Dispute over Iraq has not damaged U.S.-Russian |
| 02-08 | U.S. won't ask Saudis to allow attacks from their territory |
| 02-08 | Iraq says talks on weapons destruction making progress |
| 02-09 | Citing regional tensions, Annan cancels visit to the Middle East |
| 02-09 | Canada: No decision yet on commitment against Iraq |
| 02-09 | byline |
| 02-09 | control on Yeltsin-Annan remarks, other new material |
| 02-09 | Iraq launches campaign to rally Arab support |
| 02-09 | Iraq crisis at "critical stage," U.N. chief pushes for peaceful |
| 02-10 | Report: Lebanon tells Iraq to cooperate with weapons inspectors |
| 02-10 | Iraqi foreign minister seeks Syrian support in standoff |
| 02-10 | Precede MAJDAL SHAMS |
| 02-10 | Iraqi ambassador say Baghdad cannot meet Annan's proposed sales |
| 02-10 | Israel short on gas masks for children |
| 02-11 | Iraqi daily says Washington always determined to use force |
| 02-11 | Britain rejects latest Iraqi offer on weapons |
| 02-11 | Iraq puts oil export potential at 1.6 million barrels daily |
| 02-11 | Gulf foreign ministers meet to discuss unified stand on Iraq |
| 02-11 | BC-Iraq-Opposition |
| 02-11 | Santer says EU position will change if Iraq stays defiant |
| 02-12 | Iraqi foreign minister calls U.S. rejection "a bluff" |
| 02-12 | UN advises vacationing staff to stay away from Iraq |
| 02-13 | American, Russian defense chiefs hold cordial talks at military |
| 02-13 | Iraq accuses U.S. of psychological warfare |

*Fig. 4a*

02-13 U.S. envoy meets with Japanese leaders on Iraq
02-13 Foreign Office urges "higher degree of caution" for travelers
02-13 Iraq dispute underlines strain in U.S. − Russian ties
02-14 U.S. envoy seeks China's support on Iraq
02-14 Demonstrators at U.S. Embassy in Japan ureg no military attack
02-14 Iraq urges diplomacy, releases Egyptioan prisoners

*Fig. 4b*

06/01/1998 pakistan and india
India deniew it plans another
nuclear test, urges nuclear talks lebanon ethnic albanian
More deaths reported in
Kosovo: thousands flee More deaths reported in
Kosovo: hundreds flee world cup nicole mott's penalty corner drive

06/04/1998 kosovo broader tokyo stock price index
Dollar rises, stocks slip in Tokyo trading child labor water shortage
New Zealand claims world first of extracting pure water from thin dejammet urged butler
U.N. inspectors challenge Baghdad's claims it has destroyed illegal imported trucks plunged 47.9 percent high-speed rail link

*Fig. 5d*

SYSTEMS AND PROCESSES FOR IDENTIFYING FEATURES AND DETERMINING FEATURE ASSOCIATIONS IN GROUPS OF DOCUMENTS

CROSS-REFERENCE TO RELATED APPLICATIONS

This invention claims priority from, and is a continuation-in-part of, currently pending U.S. patent application Ser. No. 12/568,365, filed Sep. 28, 2009, which claims priority from U.S. Provisional Patent Application No. 61/222,737, entitled "Feature Extraction Methods and Apparatus for Information Retrieval and Analysis," filed Jul. 2, 2009. Both applications are incorporated herein by reference.

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

A problem today for many individuals, particularly practitioners in the disciplines involving information analysis, is the scarcity of time and/or resources to review the large volumes of information that are available and potentially relevant. Effective and timely use of such large amounts of information is often impossible using traditional approaches, such as lists, tables, and simple graphs. Tools that can help individuals automatically identify and/or understand the themes, topics, and/or trends within a body of information are useful and necessary for handling these large volumes of information. Many traditional text analysis techniques focus on selecting features that distinguish documents within a document group. However, these techniques may fail to select features that characterize or describe the majority or a minor subset of documents within the group. Furthermore, when the information is streaming and/or updated over time, the group is dynamic and can change significantly. Therefore, most of the current tools are limited in that they only allow information consumers to interact with snapshots of an information space that is often times continually changing.

Since most information sources deliver information streams, such as news syndicates and information services, and/or provide a variety of mechanisms for feeding the latest information by region, subject, and/or by user-defined search interests, when using traditional text analysis tools, new information that arrives can eclipse prior information. As a result, temporal context is typically lost with employing group-oriented text analysis tools that do not accommodate dynamic corpora. Accurately identifying and intelligently describing change in an information space requires a context that relates new information with old. Accordingly, a need exists for systems and computer-implemented processes for identifying features and determining feature associations within a group of documents, especially when the group of documents is dynamic and changes with time.

SUMMARY

This document describes systems and computer-implemented processes for identifying important features and/or for measuring feature associations in groups of documents comprising unstructured text. As used herein, a feature can refer to any sequence of characters that occurs or has the potential to occur within a text document. The features and feature associations can provide insight for individuals focused on discovery and exploration tasks within the text. Embodiments described herein can also be used for determining coherent clusters of individual keywords, especially those designated herein as high-value keywords. These clusters can embody distinct themes within a group of documents. Furthermore, some embodiments can enable identification and tracking of related themes across time within a dynamic group of documents. The grouping of documents into themes through their essential content, such as high-value keywords, can enable exploration of associations between documents independently of a static and/or pre-defined group of documents.

As used herein, a term can refer to a single word, multiple words, phrases, symbols, and/or numbers, and keywords can refer to terms, words, phrases, symbols, and/or numbers that reflect and/or represent part or all of the content of a document. An exemplary keyword can include, but is not limited to, any keyword that can provide a compact summary of a document. Additional examples can include, but are not limited to, entities, query terms, and terms or phrases of interest. Identification of keywords among the terms in the group of documents can be provided by a user, by an external source, by an automated tool that identifies the keywords among the documents, or by a combination of the above.

A theme, as used herein, can refer to a group of keywords and/or high-value keywords each of which are predominantly associated with a distinct set of documents in the group. A group may have multiple themes, each theme relating strongly to a unique, but not necessarily exclusive, set of documents.

Embodiments of the present invention can include processes and systems for identifying features and determining feature associations within a group of documents that comprise terms in unstructured text, which is maintained in a storage device and/or received through communications hardware. The process can comprise providing a plurality of keywords identified among the terms of at least some of the documents. Preferably, one or more keywords are identified for each document. A value measure can be calculated for each keyword, wherein the value measure of a particular keyword is a function of the number of documents, within the group, in which the particular keyword occurs and of the number of documents for which it is a keyword. High-value keywords are defined as those keywords having value measures that exceed a threshold. In some instances, high-value keywords comprise a number (n) of keywords that have the greatest value measures that exceed the threshold, wherein n is a whole number determined by a function of the number of documents.

For each high-value keyword, term-document associations (TDA) are accessed. The TDA are stored in a storage device and characterize measures of association between each term and at least some documents in the group. A processor quantifies similarities between unique pairs of high-value keywords based on the TDA for each respective high-value keyword and generates a similarity matrix that indicates one or more sets that each comprise highly associated high-value keywords.

Some embodiments can further comprise grouping by a processor the high-value keywords into clusters according to the similarity matrix such that each cluster contains at least a part of the set of highly associated high-value keywords as determined, at least in part, by a predetermined clustering threshold. Accordingly, clusters contain at least some of the high-value keywords. To each cluster can be assigned any document having one or more keywords matching a member of the respective set of highly associated high-value keywords. Furthermore, each cluster can be labeled with the high-value keyword from the respective set of highly associated high-value keywords identified in the most number of documents in the group. In some instances, the grouping can comprise applying hierarchical agglomerative clustering to similarities between unique pairs of high-value keywords.

In some embodiments, the TDA can comprise one or more term-document bitsets. The bitsets are data structures comprising occurrence values representing presence or absence of terms within one or more defined fields that occur in documents. Examples of defined fields can include, but are not limited to full text fields for accessing every term of the documents in the group, categorical fields for accessing defined categorical values of the documents in the group, and keyword fields for accessing keywords identified within the text content of the documents in the group.

In one instance, the occurrence values for a particular term can be stored in a first bitset while an indicator of whether or not the particular term is a keyword can be stored in a second bitset. Accordingly, the TDA for the particular term would comprise two term-document bitsets.

In another instance, terms can be submitted as queries to a search index based on the group of documents in order to identify the presence or absence of terms within the one or more defined fields occurring within the documents. In each case, the set of search results for a particular term in a particular field provides the full set of documents in the group that contain that term in that field and is used to create a bitset for that term. Examples of the defined fields include, but are not limited to, full text fields, categorical fields, and keyword fields.

For instances and embodiments in which the TDA comprises one or more term-document bitsets, said quantifying similarities can comprise quantifying similarities between high-value keywords using Jaccard similarity coefficients of respective bitsets of the high-value keywords. Alternatively, said quantifying similarities can comprise calculating an f-score based on measures of precision and recall. Further still, said quantifying can comprise using normalized pointwise mutual information of respective bitsets of the high-value keywords.

In other embodiments, the TDA for a particular high-value keyword can be a lexical unit document association (LUDA) vector, which is a vector data structure and comprises values representing frequencies of the terms within each document in the collection.

Identification of features and determination of feature associations can be executed on a processor and can comprise generating a lexical unit document association (LUDA) vector for each high-value keyword that has been provided and quantifying similarities between each unique pair of high-value keywords. The LUDA vector characterizes a measure of association between its corresponding high-value keyword and documents in the group. In some instances, the high-value keywords can then be grouped into clusters such that each cluster contains a set of high-value keywords that are most similar as determined by the LUDA vectors and a predetermined clustering threshold. In other instances, each cluster can be assigned a theme label comprising the high-value keywords within each cluster that has the greatest measure of association.

In some embodiments, the keywords can be provided after having been automatically extracted from individual documents within the group of documents. In a particular instance, extraction of keywords from the group of documents can comprise parsing words in an individual document by delimiters, stopwords, or both to identify candidate keywords. Co-occurrences of words within the candidate keywords are determined and word scores are calculated for each word within the candidate keywords based on a function of co-occurrence degree, co-occurrence and frequency, or both. A keyword score is then calculated for each candidate keyword based on a function of word scores for words within the candidate keywords. Keyword scores for each candidate keyword can comprise a sum of the word scores for each word within the candidate keyword. A portion of the candidate keywords can then be selected for extraction as high-value keywords based, at least in part, on the candidate keywords with highest keyword scores. In some embodiments, a predetermined number, n, of candidate keywords having the highest keyword scores are extracted as the high-value keywords.

In preferred embodiments, co-occurrences of terms are stored within a co-occurrence graph. Furthermore, adjoining candidate keywords that adjoin one another at least twice in the individual document and in the same order can be joined along with any interior stopwords to create a new candidate keyword.

When grouping the high-value keywords into clusters, the measure of term-document association can be determined by submitting each high-value keyword as a query to the group of documents and then storing document responses from the queries as the TDA measures. Alternatively, the TDA can be determined by quantifying frequencies of each high-value keyword within each document in the group and storing the frequencies as the measures. In yet another embodiment, the measure of association is a function of frequencies of each word within the high-value keywords within each document in the group. In specific instances, the similarities between high-value keywords can be quantified using Sorenson similarity coefficients of respective LUDA vectors. Alternatively, the similarity between high-value keywords can be quantified using normalized pointwise mutual information of respective LUDA vectors.

In preferred embodiments, grouping of high-value keywords comprises applying hierarchical agglomerations clustering to successively join similar pairs of high-value keywords into a hierarchy. In a specific instance, the hierarchical clustering is Ward's hierarchical clustering, and clusters are defined using a coherence threshold of 0.65.

The group of documents can be static or dynamic. A static group refers to a more traditional understanding in which the group is fixed with respect to content in time. Alternatively, a dynamic group can refer to streamed information that is updated periodically, regularly, and/or continuously. Stories, which can refer to a dynamic set of documents that are associated to the same themes across multiple intervals and can emerge from analysis of a dynamic group. Stories can span multiple documents in time intervals and can develop, merge, and split as they intersect and overlap with other stories over time.

If the group of documents is dynamic, the providing, calculating, defining, accessing, quantifying, and generating steps can be repeated at pre-defined intervals. In addition, if operating on a dynamic group of documents, embodiments of the present invention can maintain a sliding window over time, removing old documents as time moves onward. The duration of the sliding window can be pre-defined to minimize any problems associated with scalability and the size of the group. Since the sliding window can limit how far back in time a user can analyze data, preferred embodiments allows a user to save to a storage device a copy of any current increment of analysis.

One example of a system for identifying features and determining feature associations within a group of documents that comprise terms in unstructured text includes a storage device or communications interface operably connected to a processor. The group of documents can be maintained in the storage device and/or streamed through the communications hardware. An input device, the storage device, and/or the communications hardware can be configured to provide a plurality of keywords during operation. The processor is programmed to calculate a value measure for each keyword, wherein the value measure of a particular keyword is a function of the number of documents, within the group, in which the particular keyword occurs and of the number of documents for which it is a keyword. High-value keywords are defined as those keywords having value measures that exceed a threshold. The processor is used to access TDAs for each high-value keyword, wherein the TDA are stored in a storage device and characterize measures of association between each term and at least some documents in the group. Similarities are quantified between unique pairs of high-value keywords based on the TDA for each respective high-value keyword. The processor then generates a similarity matrix that indicates one or more sets, each comprising highly associated high-value keywords.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

FIG. 3 is a table that summarizes the calculated themes for Jan. 12, 1998 Associated Press documents in the TDT-2 Group.

DETAILED DESCRIPTION

Figure 1:
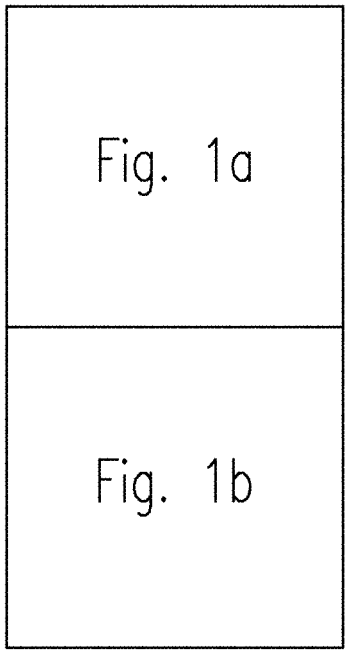
FIG. 1 includes a Voice of America news article and automatically extracted keywords according to embodiments of the present invention.

The following description includes at least the best mode of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Many current text analysis techniques focus on identifying features that distinguish documents from each other within an encompassing document group. These techniques may fail to select features that characterize or describe the majority or a minor subset of the group. Furthermore, when the information is streaming, the group is dynamic and can change significantly over time. Techniques that evaluate documents by discriminating features are only valid for a snapshot in time.

According to one example for a given group of documents, whether static or representing documents within an interval of time, keywords are extracted from the documents, a high-value set of extracted keywords are identified among terms in the documents, similarities between each unique pair of keywords in the high-value set are calculated based on the similarity of their respective term-document associations, and 4) the keywords within the high-value set are grouped into coherent themes by applying a clustering algorithm to the keyword similarities.

To more accurately characterize documents within a group, preferred embodiments of the present invention apply computational methods for characterizing each document individually. Such methods produce information on what a document is about, independent of its current context. Analyzing documents individually also further enables analysis of massive information streams as multiple documents can be analyzed in parallel or across a distributed architecture. In order to extract content that is readily identifiable by users, techniques for automatically extracting keywords can be applied, and in the preferred embodiments they are persisted within a keyword field in a document centric search index, key-value store, or database in order to efficiently access an individual document's extracted keywords. Rapid Automatic Keyword Extraction (RAKE) is one such technique that can take a simple set of input parameters to automatically extract keywords from a single document.

Details regarding RAKE are described in U.S. patent application Ser. No. 12/555,916, filed on Sep. 9, 2009, which details are incorporated herein by reference. Briefly, RAKE is a computer implemented process that parses words in an individual document by delimiters, stopwords, or both to identify keywords. Co-occurrences of words within the keywords are determined and word scores are calculated for each word within the keywords based on a function of co-occurrence degree, co-occurrence and frequency, or both. A keyword score is then calculated for each keyword based on a function of word scores for words within the keywords. Keyword scores for each keyword can comprise a sum of the word scores for each word within the keyword. A portion of the keywords can then be selected for extraction as high-value keywords based, at least in part, on the keywords with highest keyword scores. In some embodiments, a predetermined number, n, of keywords having the highest keyword scores are extracted as the keywords of the document.

FIG. 1 shows extracted keywords of a news article from Voice of America (VOA). Exemplary keywords from the (VOA) news article include Pakistan Muslim League-N leader Nawaz Sharif and criticized President Pervez Musharraf.

Keywords, which may comprise one or more words, provide an advantage over other types of signatures as they are readily accessible to a user and can be easily applied to search other information spaces. The value of any particular keyword can be readily evaluated by a user for their particular interests and applied in multiple contexts. Furthermore, the direct correspondence of extracted keywords with the document text improves the accessibility of a user with the system.

For a given group of documents, whether static or representing documents within an interval of time, a set of extracted high-value keywords were selected and grouped into coherent themes by applying a hierarchical agglomerative clustering algorithm to a similarity matrix based on term-document associations for each high-value keyword from the group of documents. High-value keywords that are selected for the set can have a higher ratio of extracted document frequency, or the number of documents from which the high-value keyword was extracted as a keyword, to total document frequency, or are otherwise considered representative of a set of documents within the group.

For an arbitrary set of documents, which may be all documents within a group, documents within a defined time-range, or matching a particular query, a set of high-value keywords representative of the content within those documents may be identified by calculating a value measure for all keywords extracted from documents within the set and selecting those keywords with the highest scores as high-value keywords. The value measure can be calculated as the product of the number of documents from which the keyword was extracted (referred to as extracted document frequency, or edf) and the ratio of edf to the number of documents containing that keyword as a word or phrase (document frequency, or df) raised to some power. In one embodiment, a power of 2 is used. However a power less than 2 can be used to diminish the impact of the ratio of edf to df and result in more common keywords being selected. A power greater than 2 can be used to increase the impact of the ratio of edf to df to the final value measure and result in more specific keywords being selected as high-value keywords.

The association of each high-value keyword within this set to documents within the group is measured as the document's response to the keyword, which can be obtained by submitting each high-value keyword as a query to a Lucene index populated with documents from the group. The query response of each document hit greater than 0.1 is accumulated in the high-value keyword's LUDA vector or bitset. In most cases the number of document hits to a particular high-value keyword query is a small subset of the total number of documents in the index. LUDA vectors can have fewer entries than there are documents in the group and can be very heterogeneous.

The similarity among the unique pairs of high-value keywords is calculated as the similarity of their respective document associations. In the preferred embodiment, the term document associations (TDA) reflect whether a particular term (or keyword) occurs within particular text fields and keyword or categorical fields of the document. For a unique pair of high-value keywords, i and j, one or more contingency tables can be created from the document field intersections of i and j. Similarity between the terms can then be calculated from these contingency tables by applying either the Jaccard similarity coefficient, Dice's coefficient, or the normalized pointwise mutual information measure to the values within the contingency table.

The similarity between each unique pair of high-value keywords can be calculated as the Sorensen similarity coefficient of the high-value keywords' respective LUDA vectors or bitsets. The Sorensen similarity coefficient is used in some instances due to its effectiveness on heterogeneous vectors and is identical to 1.0-Bray-Curtis distance, shown in equation (1).

$$BC_{ab} = \frac{\Sigma |a_i - b_i|}{\Sigma (a_i + b_i)} \qquad \text{Eqn. 1}$$

Coherent groups of high-value keywords can then be calculated by clustering high-value keywords by their similarity. Because the number of coherent groups may be independent of the number of high-value keywords, Ward's hierarchical agglomerative clustering algorithm, which does not require a pre-defined number of clusters, can be applied.

Ward's hierarchical clustering begins by assigning each element to its own cluster and then successively joins the two most similar clusters into a new, higher-level, cluster until a single top level cluster is created from the two remaining, least similar, ones. The decision distance $dd_{ij}$ between these last two clusters is typically retained as the maximum decision distance $dd_{max}$ for the hierarchy and can be used to evaluate the coherence $cc_n$ of lower level clusters in the hierarchy as shown in equation (2).

$$cc_n = 1 - \frac{dd_n}{dd_{max}} \qquad \text{Eqn. 2}$$

Clusters that have greater internal similarity will have higher coherence. Using a high coherence threshold prevents clusters from including broadly used high-value keywords such as president that are likely to appear in multiple clusters. In preferred embodiments, clusters with a coherence threshold of 0.65 or greater are selected as themes for the group of documents.

Each theme comprises high-value keywords that typically return the same set of documents when applied as a query to the document group. These high-value keywords occur in multiple documents together and may intersect other stories singly or together.

High-value keywords within each theme are then ranked by their associations to documents assigned within the theme. Hence the top ranked high-value keyword for each theme best represents documents assigned to the theme and is used as the theme's label.

EXAMPLE

Computation and Analysis of Significant Themes in the Multi-Perspective Question Answering Group (MPQA)

The MPQA Group consists of 535 news articles provided by the Center for the Extraction and Summarization of Events and Opinions in Text (CERATOPS). Articles in the MPQA Group are from 187 different foreign and U.S. news sources and date from June 2001 to May 2002.

Figure 2:
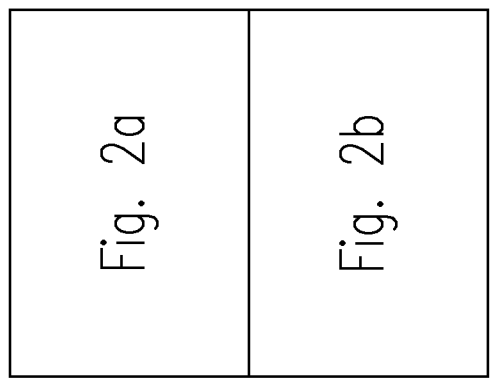
FIG. 2 is a table comparing assigned topics in the Multi-perspective question answering group and themes calculated according to embodiments of the present invention.

RAKE was applied to extract terms as keywords from the title and text fields of documents in the MPQA Group. High-value keywords that occurred in at least two documents were selected from those that were extracted. Embodiments of the present invention were then applied to compute themes for the group. Of the 535 documents in the MPQA Group, 327 were assigned to 10 themes which align well with the 10 defined topics for the group as shown in FIG. 2. The number of documents that CAST assigned to each theme is shown in parentheses. As defined by CERATOPS:

> The majority of the articles are on 10 different topics, but a number of additional articles were randomly selected (more or less) from a larger group of 270,000 documents.

The majority of the remaining themes computed in the instant example had fewer than four documents assigned, an expected result given the random selection of the remainder of documents in the MPQA Group.

As described elsewhere herein, embodiments of the present invention can operate on streaming information to extract essential content from documents as they are received and to calculate themes at defined time intervals. When the current time interval ends, a set of high-value keywords is selected from the extracted keywords and term document associations are measured for all documents published or received within the current and previous n intervals. High-value keywords are clustered into themes according to the similarity of their term document associations, and each document occurring over the past n intervals is assigned to the themes for which it has one or more matching keywords.

The set of themes computed for the current interval are persisted along with their member high-value keywords and document assignments. Overlap with previous and future themes may be evaluated against previous or future intervals by comparing overlap of high-value keywords and document assignments. Themes that overlap with others across time together relate to the same story.

Repeated co-occurrences of documents within themes computed for multiple distinct intervals are meaningful as they indicate real similarity and relevance of content between those documents for those intervals.

In addition to the expected addition of new documents to an existing story and aging out of documents older than n intervals, it is not uncommon for stories to gain or lose documents to other stories. Documents assigned to the same theme within one interval may be assigned to different themes in the next interval. Defining themes at each interval enables embodiments of the present invention to automatically adapt to future thematic changes and accommodate the reality that stories often intersect, split, and merge.

In order to show the utility, embodiments of the present invention were applied on documents within the Topic Detection and Tracking (TDT-2) group tagged as originating from the Associated Press's (AP) World Stream program due to its similarity to other news sources and information services of interest.

FIG. 3 lists the calculated themes on Jan. 12, 1998 for AP documents in the TDT-2 Group. The first column lists the count of documents assigned to each theme that were published before January 12. The second column lists each theme's count of documents that were published on January 12. Comparing these counts across themes allows us to easily identify which stories are new (e.g., chuan government, serena williams who is playing, men's match) and which stories are the largest (e.g., hong kong and world swimming championships).

Clusters, documents, themes, and/or stories can be represented visually according to embodiments of the present invention. Two such visual representations, which can provide greater insight into the characteristics of themes and stories in a temporal context, are described below.

Figure 4:
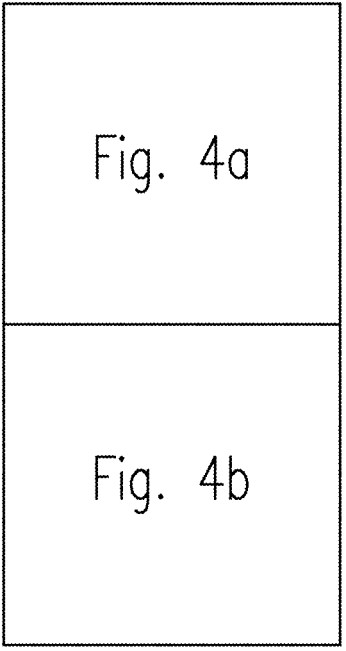
FIG. 4 is a visual representation of themes computed according to embodiments of the present invention.

The first view, a portion of which is shown in FIG. 4, represents the current time interval and its themes. The view presents each theme as a listing of its member documents in ascending order by date. This view has the advantage of simplicity. An observer can easily assess the magnitude of each theme, its duration, and documents that have been added each day. However, lacking from this view is the larger temporal context and information on how related themes have changed and evolved over previous days.

Figure 5:
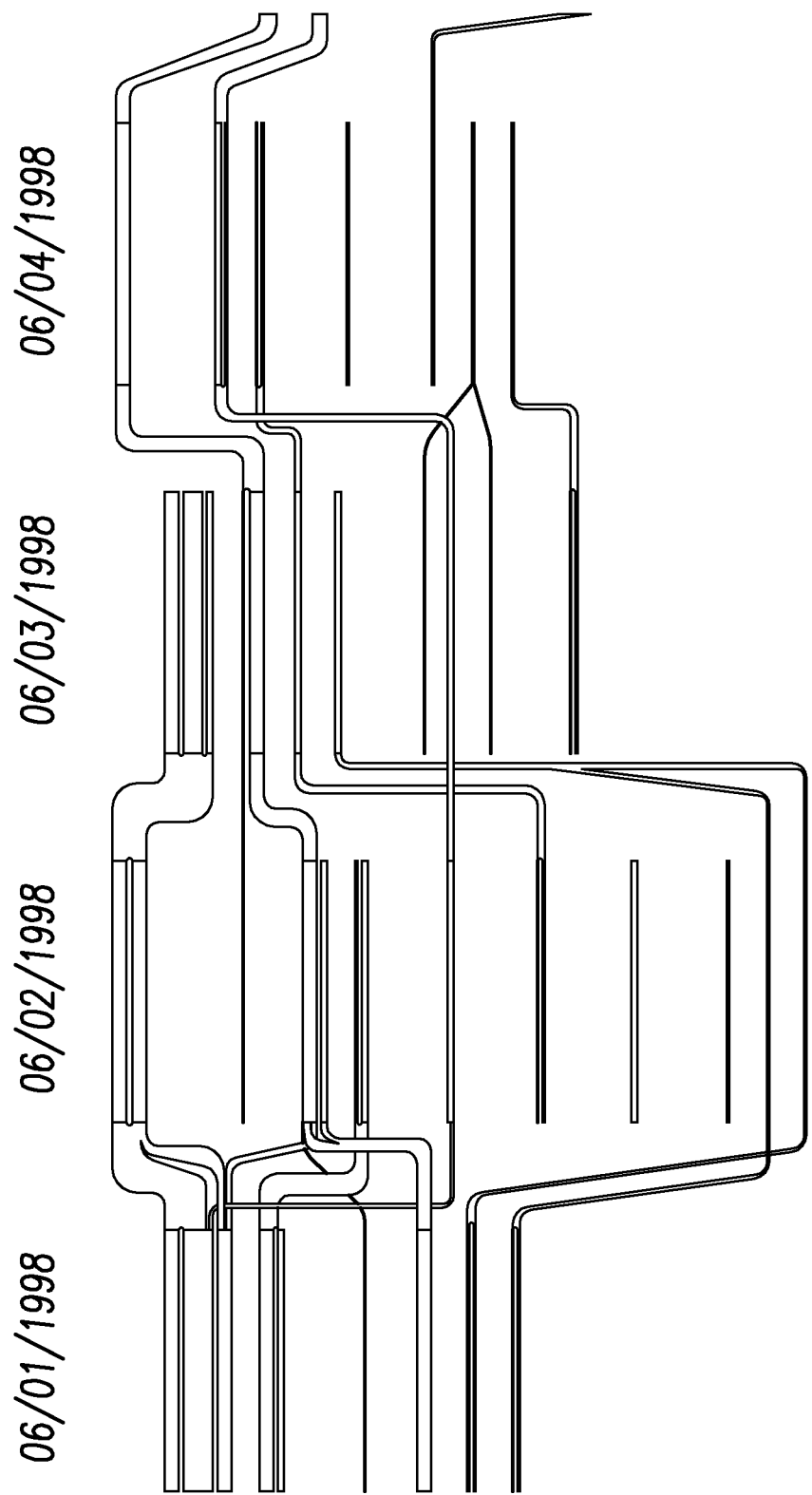
FIG. 5 is a visual representation of themes computed according to embodiments of the present invention.
Figure 5A:
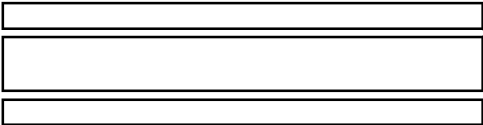
Figure 5A:
Figure 5A:
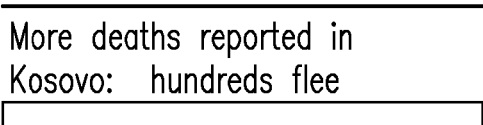
Figure 5A:
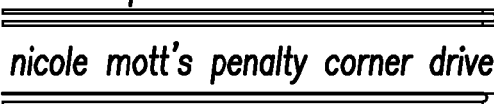
Figure 5A:
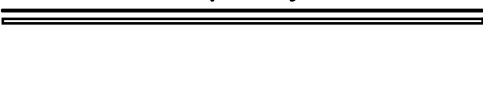
Figure 5A:
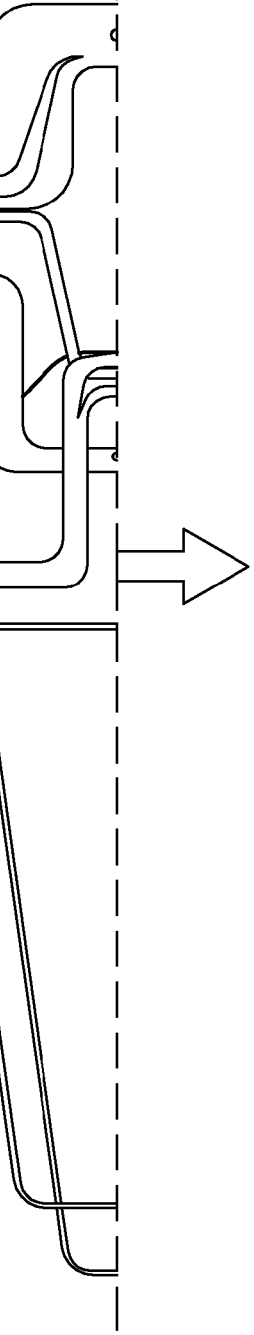
Figure 5B:
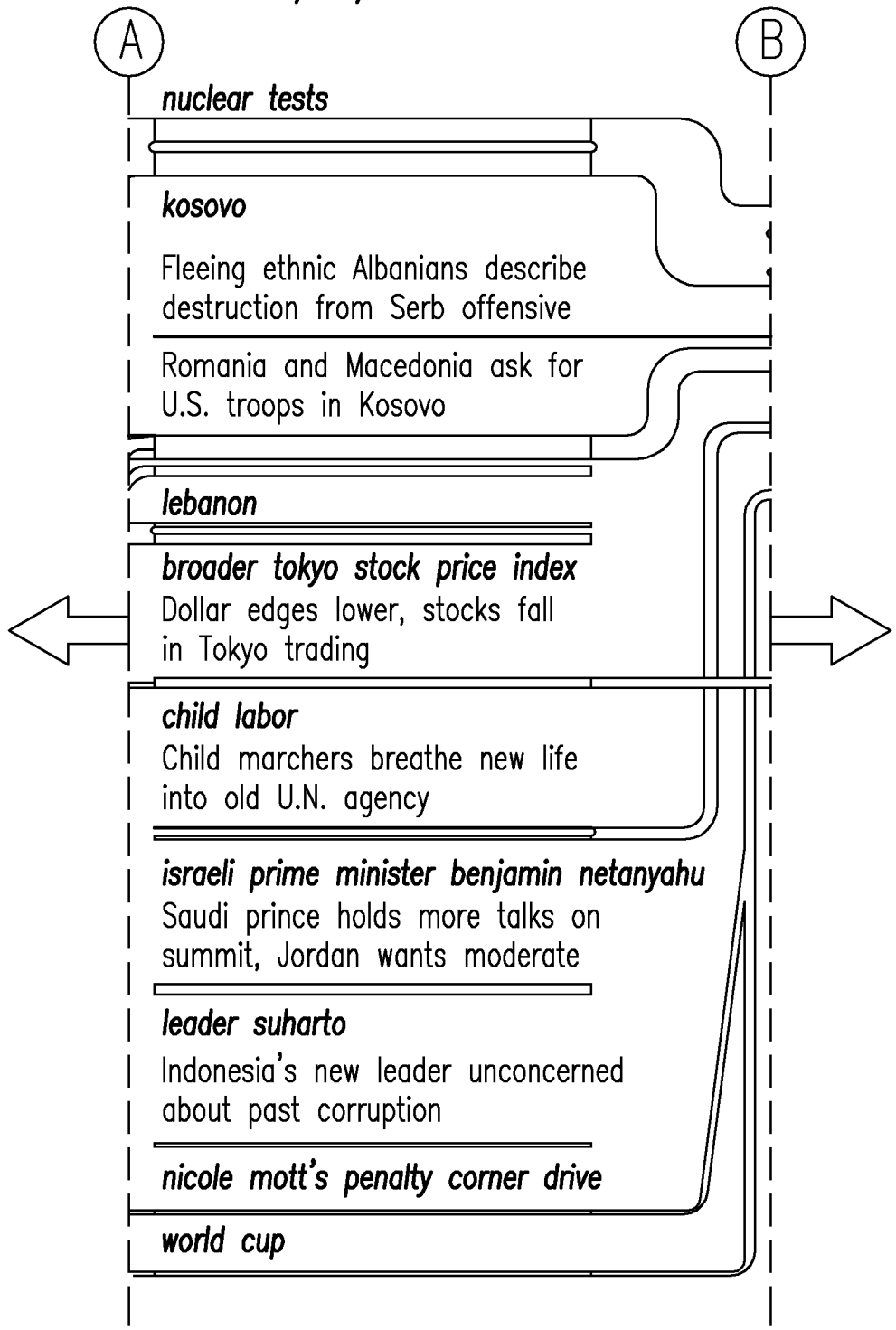
Figure 5C:
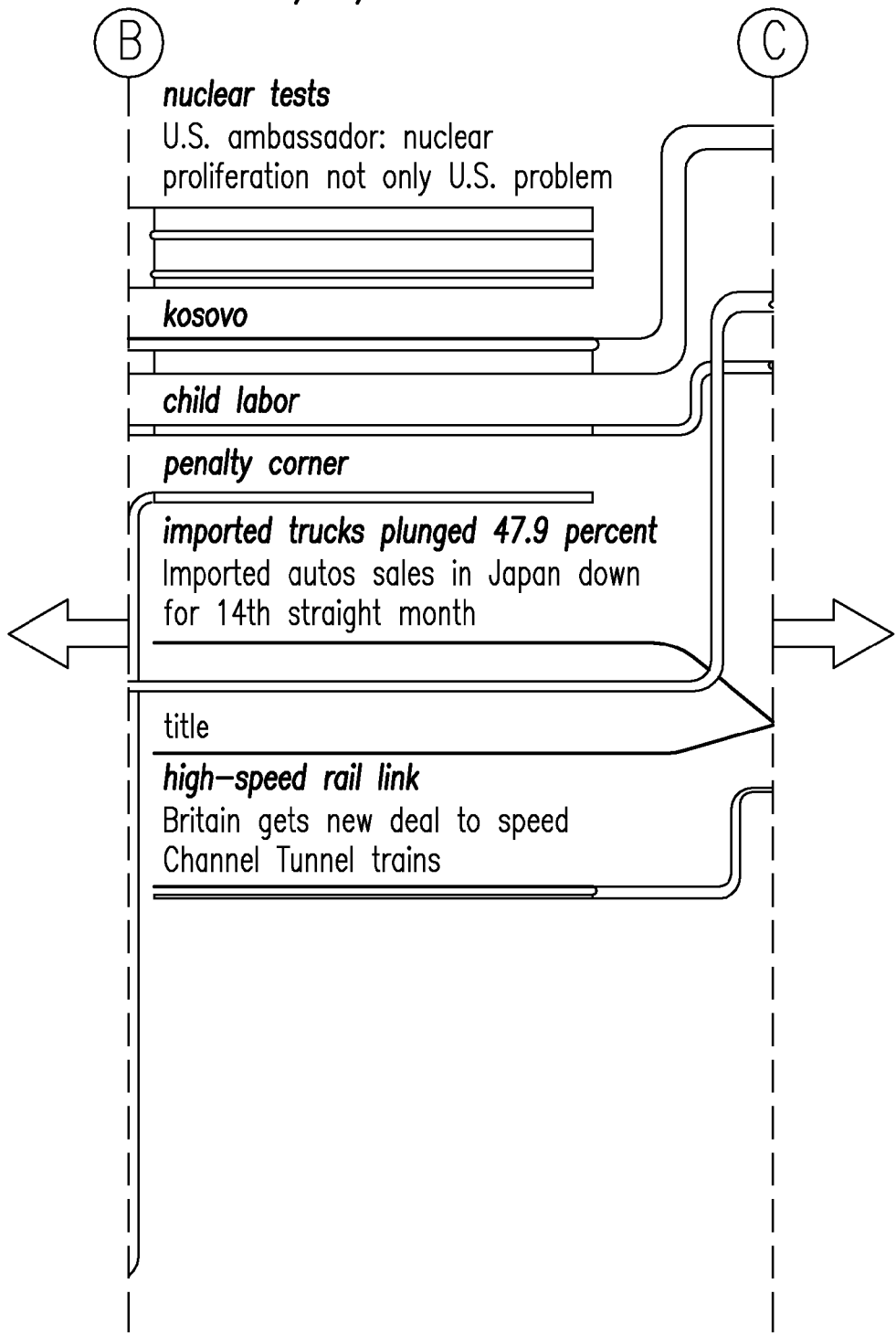

To provide a temporal context we developed the Story Flow Visualization (SFV). The Story Flow visualization, a portion of which is shown in FIG. 5, shows for a set of time intervals, the themes computed for those intervals, and their assigned documents which may link themes over time into stories. The visualization places time (e.g., days) across the horizontal axis and orders daily themes along the vertical axis by their assigned document count.

For a given interval, each theme is labeled with its top high-value keyword in italics and lists its assigned documents in descending order by date. Each document is labeled with its title on the day that it is first published (or received), and rendered as a line connecting its positions across multiple days. This preserves space and reinforces the importance and time of each document, as the document title is only shown in one location. Similar lines across time intervals represent flows of documents assigned to the same themes, related to the same story. As stories grow over days, they add more lines. A document's line ends when it is no longer associated with any themes.

Referring to FIG. 5, which shows computed themes for four days of AP documents from the TDT-2 APW group, we can see that the top story for the first three days is initially labeled Pakistan and India but changes to nuclear tests on the following two days. The theme Pakistan and India loses two documents to other themes on the following day. These are likely documents that do not relate directly to the theme nuclear tests and therefore were assigned to other stories as the earlier theme Pakistan and India became more focused on nuclear tests. No documents published on June 2 are assigned to the nuclear tests theme. Another story that is moving up over the days begins as ethnic Albanians and quickly becomes labeled as Kosovo. Stories can skip days, as shown by the documents related to the broader Tokyo stock price index themes that appear on June 2 and June 4.

Some embodiments can order schemes that take into account relative positions of related groups across days in order to minimize line crossings at interval boundaries. However, consistently ordering themes for each interval by their number of assigned documents, as is done in the present embodiment, can help ensure that the theme order for each day is unaffected by future days. This preserves the organization of themes in the story flow visualization across days and supports information consumers' extended interaction over days and weeks. An individual or team would therefore be able to print out each day's story flow column with document titles and lines, and post that next to the previous day's columns. Such an approach would be unrestricted by monitor resolution and support interaction and collaboration through manual edits and notes on the paper hard copies. Each foot of wall space could hold up to seven daily columns, enabling a nine foot wall to hold two months worth of temporal context along a single horizontal span.

On a single high-resolution monitor, seven days can be rendered as each daily column can be allocated a width of 300 pixels which accommodates most document titles. Longer time periods can be made accessible through the application of a scrolling function.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A computer-implemented process for identifying features and determining feature associations within a group of documents that comprise terms in unstructured text, which is maintained in a storage device and/or received through communications hardware, the process comprising:
    Providing a plurality of keywords identified among the terms of at least some of the documents;
    Calculating a value measure for each keyword, wherein the value measure of a particular keyword is a function of the number of documents, within the group, in which the particular keyword occurs and of the number of documents for which it is a keyword;
    Defining high-value keywords as those keywords having value measures that exceed a threshold;
    Accessing term-document associations (TDA) for each high-value keyword, wherein the TDA are stored in a storage device and characterize measures of association between each term and at least some documents in the group;
    Quantifying by a processor similarities between unique pairs of high-value keywords based on the TDA for each respective high-value keyword; and
    Generating a similarity matrix that indicates one or more sets each comprising highly associated high-value keywords.

2. The process of claim 1, further comprising defining high-value keywords as a number (n) of keywords having the greatest value measures that exceed the threshold, wherein n is based on the number of documents.

3. The process of claim 1, wherein the TDA comprises one or more term-document bitsets, the bitsets are data structures comprising occurrence values representing a presence or absence of terms within one or more defined fields that occur in documents.

4. The process of claim 3, further comprising storing in a first term-document bitset the occurrence values for a particular term and storing in a second term-document bitset an indicator of whether or not the particular term is a keyword, wherein the TDA for each term comprises two term-document bitsets.

5. The process of claim 3, further comprising submitting the terms as queries to a search index based on the group of documents, thereby identifying the presence or absence of terms within the one or more defined fields occurring within the documents.

6. The process of claim 5, wherein the defined fields are selected from the group consisting of term fields and keyword fields.

7. The process of claim 3, wherein said quantifying comprises quantifying similarities between high-value keywords using Jaccard similarity coefficients of respective bitsets of the high-value keywords.

8. The process of claim 3, wherein said quantifying similarities comprises calculating an f-score based on measures of precision and recall.

9. The process of claim 3, wherein said quantifying similarities comprises using normalized pointwise mutual information of respective bitsets of the high-value keywords.

10. The process of claim 1, wherein the TDA for a particular high-value keyword is a lexical unit document association (LUDA) vector comprising values representing frequencies of the lexical unit within each document in the collection.

11. The process of claim 10, wherein said quantifying similarities comprises using Sorensen similarity coefficients of the respective LUDA vectors of the high-value keywords.

12. The process of claim 10, wherein said quantifying similarities comprises using pointwise mutual information of the respective LUDA vectors of the high-value keywords.

13. The process of claim 1, further comprising grouping by a processor the high-value keywords into clusters according to the similarity matrix such that each cluster contains at least the set of highly associated high-value keywords as determined, at least in part, by a predetermined clustering threshold.

14. The process of claim 13, further comprising assigning to each cluster any document having one or more keywords matching a member of the respective set of highly associated high-value keywords.

15. The process of claim 13, further comprising labeling each cluster with the high-value keyword from the respective set of highly associated high-value keywords identified in the most number of documents.

16. The process of claim 13, wherein said grouping comprises applying hierarchical agglomerative clustering to similarities between unique pairs of high-value keywords.

17. The process of claim 1, further comprising repeating said providing, calculating, defining, accessing, quantifying, and generating steps at pre-defined time intervals if the group of documents is not static.

18. A system for identifying features and determining feature associations within a group of documents that comprise terms in unstructured text, which is maintained in a storage device and/or streamed through communications hardware, the system comprising:
    A storage device, a communications interface, an input device, or a combination thereof configured to provide a plurality of keywords during operation;
    A processor programmed to:
        Calculate a value measure for each keyword, wherein the value measure of a particular keyword is a function of the number of documents, within the group, in which the particular keyword occurs and of the number of documents for which it is a keyword;
        Define high-value keywords as those keywords having value measures that exceed a threshold;
        Access term-document associations (TDA) for each high-value keyword, wherein the TDA are stored in a storage device and characterizes measures of association between each term and at least some documents in the group;
        Quantify similarities between unique pairs of high-value keywords based on the TDA for each respective high-value keyword; and Generate a similarity matrix that indicates one or more sets each comprising highly associated high-value keywords.

19. The system of claim 18, wherein the TDA comprises one or more term-document bitsets, the bitsets are data structures comprising occurrence values representing a presence or absence of terms within one or more defined fields that occur in documents.

20. The system of claim 18, wherein the processor is further programmed to group the high-value keywords into clusters according to the similarity matrix such that each cluster contains at least the set of highly associated high-value keywords as determined, at least in part, by a predetermined clustering threshold.

* * * * *